Aug. 26, 1969  B. H. FIEDLER  3,463,096

ROTATING DIE WAFERING DEVICE

Filed Nov. 17, 1967

Inventor
Bruce Fiedler
By Kenneth Duckwitz
Attorney

United States Patent Office 3,463,096
Patented Aug. 26, 1969

3,463,096
ROTATING DIE WAFERING DEVICE
Bruce H. Fiedler, Milwaukee, Wis., assignor to Allis-Chalmers Manufacturing Company, Milwaukee, Wis.
Filed Nov. 17, 1967, Ser. No. 684,059
Int. Cl. A21c 11/16; B30b 5/00; B28b 3/20
U.S. Cl. 107—14                                                4 Claims

ABSTRACT OF THE DISCLOSURE

A pelleting machine provided with a movable pellet dwell portion wherein movement of the dwell portion is accomplished by pellet formation and wherein such movement can be controlled.

---

This invention relates to a machine for the field pelleting of grasses including alfalfa, clover and the like.

This invention is directed to a machine for picking up hay that has previously been cut and permitted to dry in the field, condensing the hay and subjecting it to high pressure to form small individual cakes or pellets of hay which are self-sustaining as to form, after the pressure is removed so as to be capable of being handled with little or no disintegration. The individual pellets being of a size that they can be readily handled by power conveyers and can be picked up and consumed individually by cattle.

In accordance with the present invention, a mobile unit includes a feed means for providing a pickup and flow of hay to a ram which forms it into a compressed cake or pellet. A piston forms this pellet in a die having a retention chamber forming an extension of such die which maintains the material under variable compression for a sufficient dwell period to form a dense, cohesive, pelletized product.

Another object is to produce a pelletized field cured hay or other product of predetermined density maintaining the original long fiber of the hay and formed in a convenient mouthful size for livestock.

A principal object of the invention is to provide a variable compression retention chamber for a pelletizing machine wherein the frictional force resisting movement of the pellets in the retention chamber can be readily varied and wherein most of the heat developed by such friction is dissipated in spaced removed relation to the pellets formed thus preventing burning or charring of such pellets.

A further object of the invention is to provide a relatively long compression retention chamber in a pelletizing machine which chamber utilizes a minimum of space and wherein the desired compression can be varied.

Figure 1:
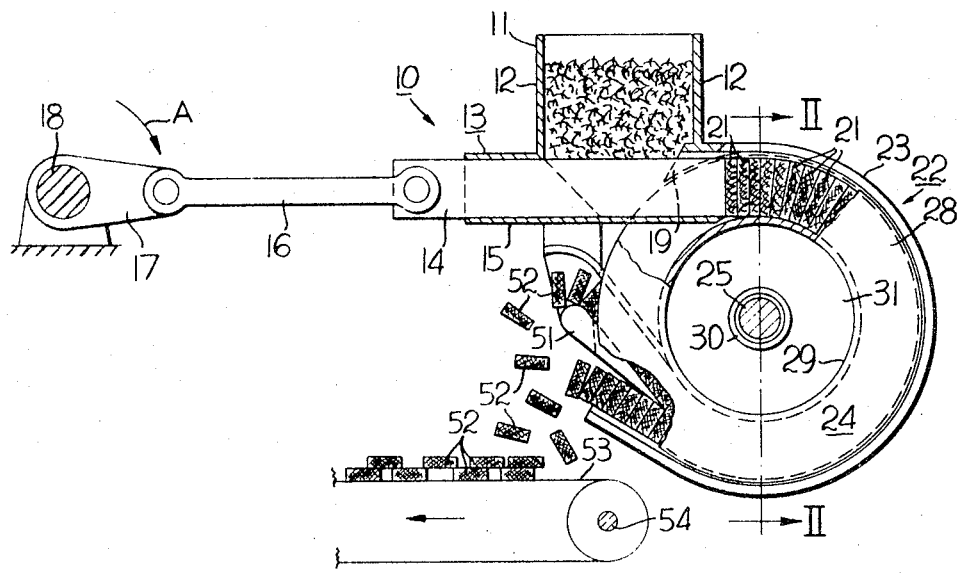
Figure 2:
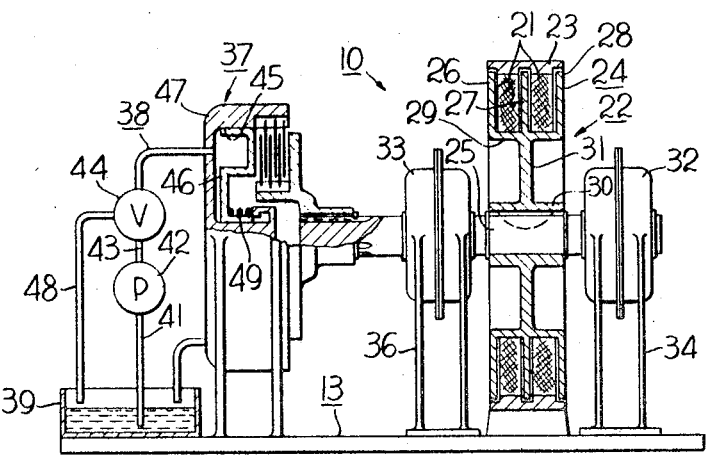
Figure 3:
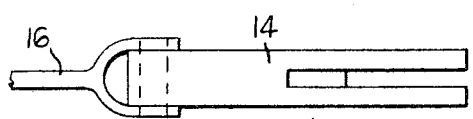

Other and further important objects and advantages will become apparent from the disclosure in the following specification and accompanying drawings, in which:

FIG. 1 is a diagrammatic side elevation of mechanism embodying the invention with portions broken away for clarity of illustration; and, FIG. 2 is a cross sectional view of the device shown in FIG. 1 taken along line II—II, parts of which are shown in elevation.

Referring to the drawings, FIG. 1 is a diagrammatic showing of field pelleting machine 10 including mechanism (not shown) of a conventional nature for picking up hay from the ground and conveying it to a receiving member 11 which includes side walls 12 carried by frame 13. A split piston or plunger 14 is positioned to reciprocate in a tube 15 formed in frame 13 beneath and open to receiving member 11. The left-hand end of piston 14 is pivotally connected to one end of a connecting rod 16 which has its other end pivotally connected to crank 17 which is attached to shaft 18 for rotation therewith in a direction shown by arrow A in FIG. 1. Conventional means (not shown) are used for rotating shaft 18.

As crank 17 rotates, piston 14 moves to the right as viewed in FIG. 1 compressing a charge of hay received from receptacle 11 against stationary knife 19 and thereby dividing the hay charge into two segments 21. Each compressed segment 21 of hay is compressed against an earlier formed segment 21. When the segments 21 have been pushed past knife 19, the segments 21 enter into a circularly extending tube 22 formed of a stationary outer band 23 carried by frame 13 and forming the outer surface of tube 22. The other portions of tube 22 are provided by a wheel 24 (FIG. 2) attached to shaft 25 for rotation therewith. The peripheral portion of wheel 24 is provided with three radially extending portions 26, 27 and 28 joined at their inner ends by a circular floor member 29 carried by web 31 which in turn is attached to hub 30 keyed to shaft 25. From viewing FIG. 2, it is seen how pellets 21 are retained in the passageways defined by band 23, radial portions 26 and 27 and floor 29 forming the first passageway. The adjoining passageway is defined by band 23, radial portion 27 and 28, and floor 29.

Shaft 25 is journaled in bearing assemblies 32 and 33 supported from frame 13 by support members 34 and 36, respectively. The left-hand end of shaft 25 (FIG. 2) is attached to a brake assembly 37 which is provided with hydraulic means 38 for varying the braking force applied to brake 37. Hydraulic means 38 includes a hydraulic fluid sump 39 carried by frame 13. A line 41 leads from the sump 39 to a pump 42 and a line 43 connects pump 42 through valve 44 with a hydraulic cylinder 45 having a piston 46 and a casing 47. Valve 44 can be positioned to return all or a portion of the output of pump 42 to sump 39 through tube 48 to thereby vary the brake force applied to shaft 25. Cylinder 45 is also provided with a spring 49 to return the piston 46 to a nonactive position when the hydraulic pressure is relieved to a desired extent.

In other words, brake 37 can be adjusted through a range preventing rotation of wheel 24 to a point where wheel 24 will rotate freely. Between these two extremes hydraulic means 38 permits adjustment of brake 37 so that the desired density of pellets 21 is achieved.

At the lower or discharged end of wheel 24, a stationary knife 51 is mounted on frame 13 for cutting pellets 21 into two portions 52 which fall on conveyer 53 for movement to a point of collection. Operation of conveyer 53 is accomplished by conventional means (not shown) and can be an internal combustion engine operatively connected to shaft 54 of conveyer 53 for moving the upper run of the conveyer in the direction shown in FIG. 1.

From a study of FIG. 1, it is seen that even without the use of brake 37, a great deal of resistance to the passage of pellets 21 around wheel 24 is provided. First of all, there is the frictional force provided by the movement of the pellets in contact with band 23. Secondly, this frictional force is enhanced by band 23 being circular in configuration and thirdly knife 51 in cutting pellet 21 exerts a force acting against the normal movement of the pellets much the same as the frictional forces aforementioned. To this then can be added the friction induced by brake means 37. And as the amount of braking force can be adjusted, one can arrive at just the exact amount of frictional force desired to provide the pellets with the desired qualities. It is to be understood that the necessary frictional force required for optimum results will vary with the type of hay being used and with its moisture content. It is apparent that by having a great deal of the frictional force applied by brake 37 which is positioned in spaced removed relation to the pelleting machine as a whole, heat generated at the brake does not affect the pellets and accordingly there is less chance for burning or charring pellets with machines embodying the present invention.

The embodiments of the invention in which an exclusive property or privilege is claimed are defined as follows:

1. A hay pellet forming machine, comprising: a frame supporting structure, a pellet forming tube mounted on said frame supporting structure, means carried on said frame supporting structure and arranged and constructed to move the hay into said pellet forming tube, a reciprocating plunger arranged and constructed to slidably engage said pellet forming tube and compress the hay thereinto, and discharge means for curing said hay pellets, said discharge means defining a tubular curved extension of said pellet forming tube positioned in proximate pellet receiving relation to said pellet forming tube, said extension including a portion adapted to be rotated responsive to pellet movement from said forming tube.

2. A hay pellet forming machine, comprising: a frame supporting structure, a pellet forming tube mounted on said frame supporting structure, means carried on said frame supporting structure and arranged and constructed to move the hay into said pellet forming tube, a reciprocating plunger arranged and constructed to slidably engage longitudinally of said pellet forming tube and compress the hay thereinto, and discharge means for curing said hay pellets, said discharge means defining a tubular circular extension of said pellet forming tube positioned in proximate pellet receiving relation to said pellet forming tube, said extension including a portion adapted to be rotated responsive to pellet movement from said forming tube.

3. A pellet forming machine as recited in claim 2 and wherein said tubular circular extension comprises a central portion adapted to be rotated and a stationary peripheral portion and wherein pellets discharged from said forming tube are received between said central portion and said stationary portion for conveyance to a point of collection.

4. A pellet forming machine as recited in claim 3 and adjustable brake means coacting with said central portion for retarding the rotation thereto to provide the desired density in said pellets.

References Cited

UNITED STATES PATENTS 2,310,748  2/1943  Pearson.
3,348,475  10/1967  Fenster et al. _____ 100—177

BILLY J. WILHITE, Primary Examiner

U.S. Cl. X.R.

25—12; 100—98, 177, 185